United States Patent
Wassmus et al.

(10) Patent No.: US 12,000,598 B2
(45) Date of Patent: Jun. 4, 2024

(54) COOKING APPLIANCE HAVING A SUPPORT AND A COOKING BODY

(71) Applicant: RATIONAL International AG, Heerbrugg (CH)

(72) Inventors: Reinhard Wassmus, Heerbrugg (CH); Markus Lingenheil, Heerbrugg (CH); Mathieu Mougey, Heerbrugg (CH); Daniel Roessner, Heerbrugg (CH); Florian Loew, Heerbrugg (CH); Frederik Silversand, Heerbrugg (CH)

(73) Assignee: RATIONAL INTERNATIONAL AG (CH)

( * ) Notice: Subject to any disclaimer, the term of this patent is extended or adjusted under 35 U.S.C. 154(b) by 763 days.

(21) Appl. No.: 17/254,761

(22) PCT Filed: Jun. 17, 2019

(86) PCT No.: PCT/EP2019/065918
§ 371 (c)(1),
(2) Date: Dec. 21, 2020

(87) PCT Pub. No.: WO2019/243277
PCT Pub. Date: Dec. 26, 2019

(65) Prior Publication Data
US 2021/0278088 A1      Sep. 9, 2021

(30) Foreign Application Priority Data

Jun. 19, 2018   (DE) .................... 10 2018 114 678.7

(51) Int. Cl.
*F24C 3/08*       (2006.01)
*F24C 15/16*      (2006.01)
*A47J 27/14*      (2006.01)

(52) U.S. Cl.
CPC .............. *F24C 3/087* (2013.01); *F24C 3/085* (2013.01); *F24C 15/16* (2013.01); *A47J 27/14* (2013.01)

(58) Field of Classification Search
CPC . F23K 5/005; F23D 23/00; A47J 27/14; A47J 36/34; A47J 27/002
See application file for complete search history.

(56) References Cited

U.S. PATENT DOCUMENTS 16,349 A       1/1857   Beardsley

FOREIGN PATENT DOCUMENTS

| AT | 210582 | 8/1960 | |
| CN | 101803863 A * | 8/2010 | .............. A47J 27/14 |

(Continued)

OTHER PUBLICATIONS

International Preliminary Report on Patentability issued in PCT/EP2019/065918, dated Dec. 22, 2020, 7 pages.
(Continued)

*Primary Examiner* — Jorge A Pereiro
(74) *Attorney, Agent, or Firm* — HAYES SOLOWAY P.C.

(57) ABSTRACT

A cooking device has at least one support and a cooking body which is rotatably attached to the support via a rotatable axis, the cooking body has a tub-shaped cooking container and at least one gas burner. The cooking device has at least one supply line for the gas burner, which is connected to the gas burner, which extends through the rotatable axis and which is configured concentrically with the rotatable axis. The cooking device has an outer pipe surrounding the supply line, the supply line having a smaller diameter than the rotatable axis, as a result of which an annular gap is formed radially between the supply line and the wall of the outer pipe.

16 Claims, 3 Drawing Sheets

(56) References Cited

FOREIGN PATENT DOCUMENTS

Figure 1:
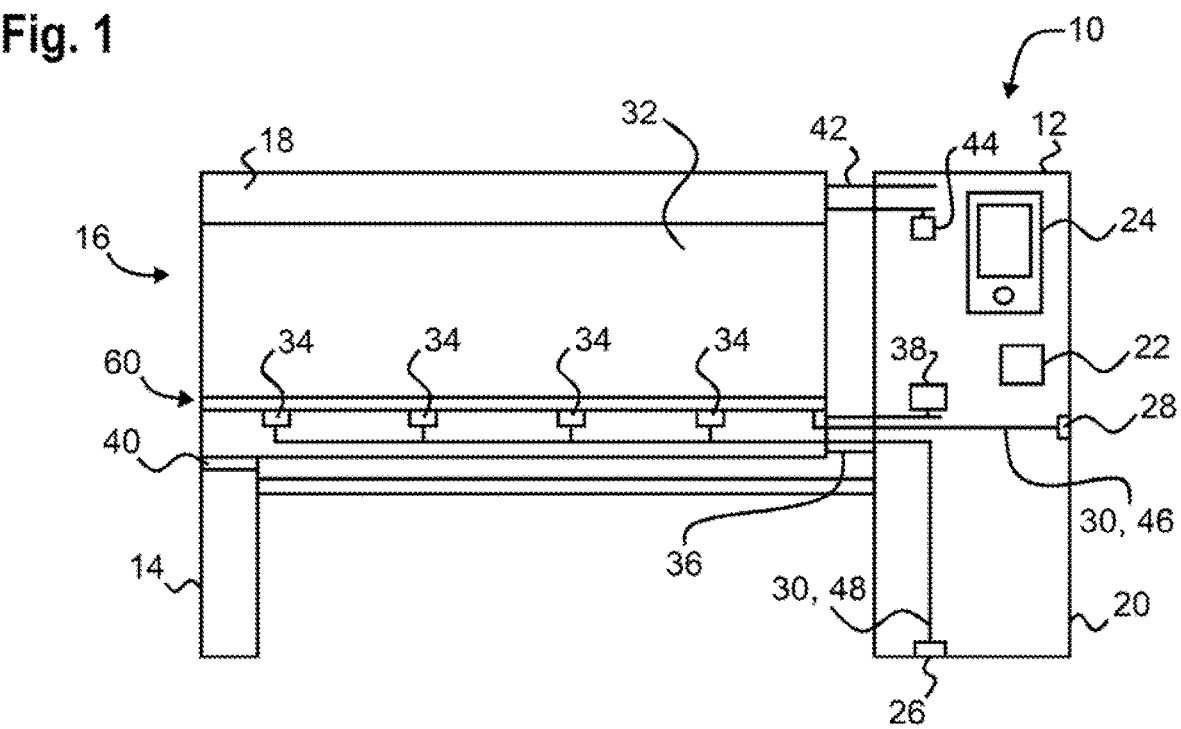

| DE | 10 2012 015 912 | | 2/2017 | |
|---|---|---|---|---|
| KR | 20-2008-0003248 | | 8/2008 | ............. A47J 27/14 |
| KR | 20100003235 U | * | 3/2010 | |
| KR | 10-2015-0057573 | | 5/2015 | ............... F24C 3/08 |
| KR | 101583194 B1 | * | 1/2016 | |

OTHER PUBLICATIONS

International Search Report and Written Opinion issued in PCT/EP2019/065918, dated Sep. 24, 2019, with English translation, 16 pages.

\* cited by examiner

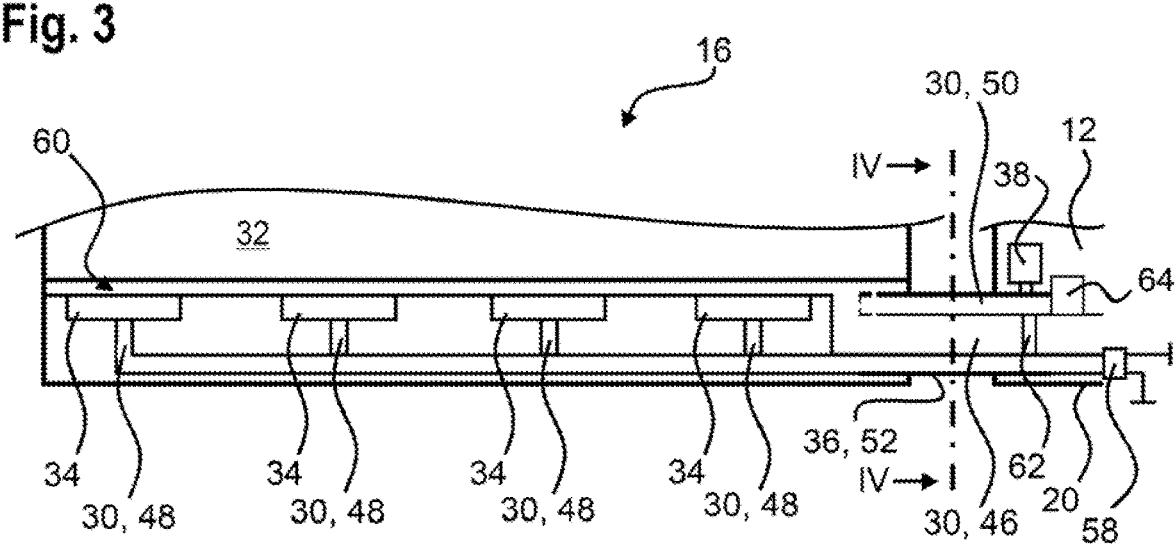
Fig. 3
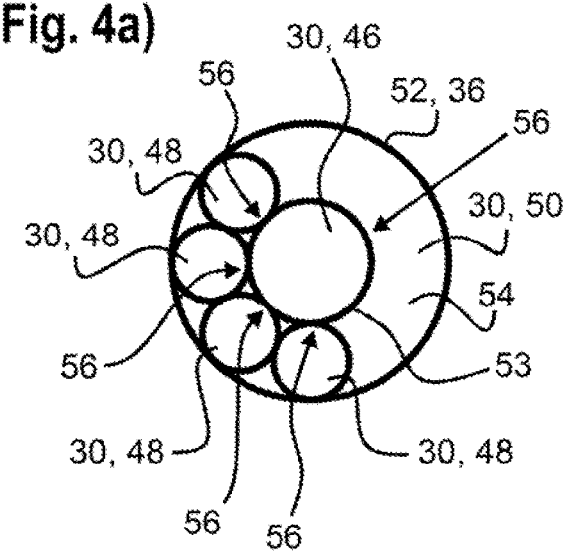
Fig. 4a)
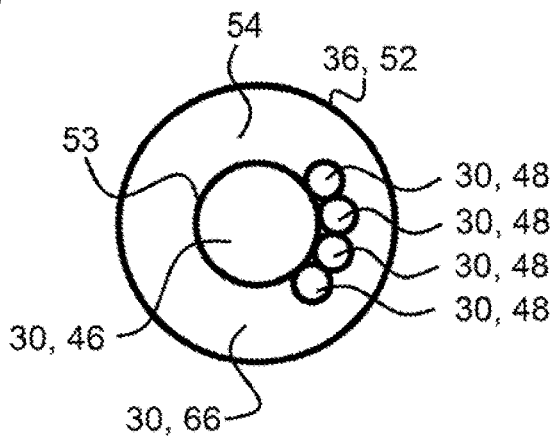
c)
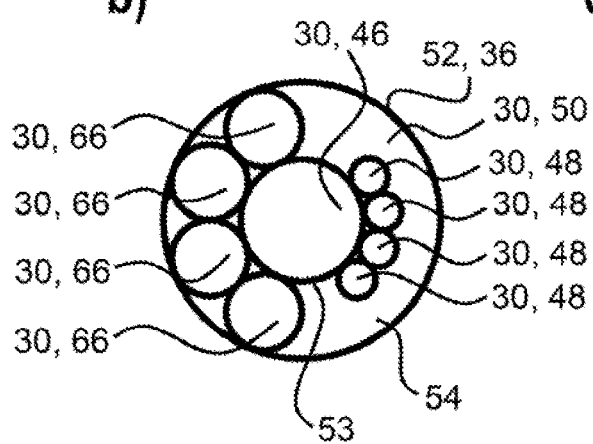
b)
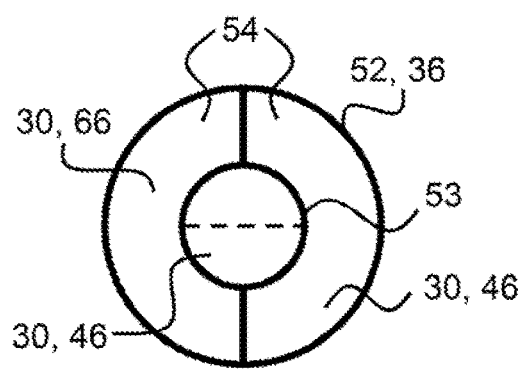
d)

COOKING APPLIANCE HAVING A SUPPORT AND A COOKING BODY

The invention relates to a cooking device having at least one support and a cooking body which is rotatably attached to the support via a rotatable axis.

In such cooking devices, a tub-shaped cooking container which is heated by a heating device in the cooking body is usually formed in the cooking body.

In the case of an electric heating device, both the heating device and the cooking container can be swivelled relative to the support in order to be able to easily remove food to be cooked from the cooking container.

Gas-operated cooking devices of this type are also known, wherein the gas burners are here arranged immovably below the cooking container and cannot be rotated along with the cooking container. As a result, the gas burners become heavily soiled and a greater distance between the gas burner and the cooking container is necessary, which reduces efficiency. However, such gas-operated cooking devices are desired as gas-operated cooking devices have a much greater mobility.

Therefore, it is the object of the invention to provide a gas-operated cooking device having at least one support and a cooking body, having gas burners in the cooking body which can be operated in a safe and reliable manner.

The object is achieved by a gas-operated cooking device having at least one support and a cooking body which is rotatably attached to the support via a rotatable axis, the cooking body comprising a tub-shaped cooking container and at least one gas burner. The cooking device has at least one supply line for the gas burner which is connected to the gas burner, which extends through the rotatable axis and which is configured concentrically with the rotatable axis. The cooking device also has an outer pipe surrounding the supply line, the supply line having a smaller diameter than the rotatable axis, as a result of which an annular gap is formed radially between the supply line and the wall of the outer pipe.

As the supply line for the gas burners is guided through the rotatable axis, the supply line is protected from environmental influences, on the one hand, and, on the other hand, experiences a precisely determinable load during rotation. This allows the supply line to be configured safely and reliably, making it possible to provide gas burners in the cooking body itself, which are rotated along with the cooking container. The cooking body may thus be configured as a coherent, compact unit, thus increasing the efficiency of the energy transfer between the gas burner and the cooking container.

In particular, the at least one gas burner is firmly attached to the cooking container. The at least one gas burner and the cooking container thus rotate together. In particular, the cooking body is connected to the rotatable axis for joint rotation therewith.

The at least one supply line can be configured in sections, in particular in the rotatable axis, as a hose or as a pipe.

For a particularly compact design, the at least one supply line is configured concentrically with the rotatable axis.

In addition, the space in the rotatable axis can be used in an effective manner as the annular gap is formed between the supply line and the wall of the outer pipe.

Preferably, the at least one supply line is a line for fuel, in particular gas or a gas-air mixture, for air, in particular fresh air or cooling air, or for exhaust gas, which allows the necessary process gases and/or exhaust gases to be efficiently transported to or from the gas burner.

To permit a reliable tilting of the cooking body, a drive may be provided in the support, which is configured such that it can rotate the rotatable axis along with the cooking body.

For example, the drive is an electric drive.

In one variant embodiment, at least one first supply line and at least one second supply line are provided, in particular wherein the first supply line is configured as an exhaust gas line and the second supply line is configured as a fuel line or air line, in particular as a fresh air line or cooling air line. This allows different process gases to be passed through the rotatable axis.

One fuel line and/or one fresh air line may be provided for each gas burner in order to supply each gas burner in an optimum manner.

For example, at least one third supply line is provided, the third supply line being in particular configured as a cooling air line, and/or at least one fourth supply line is provided, the fourth supply line being in particular configured as a fresh air line. Thus, all necessary process and exhaust gases can be led through the rotatable axis.

Further supply lines, e.g. second, third and/or fourth supply lines, may be arranged radially outside the concentric supply line.

Preferably the annular gap is configured as at least one further supply line and/or a further supply line runs in the annular gap, which allows a plurality of supply lines to be realized in a simple way.

The further supply line may be a second, third and/or fourth supply line.

For example, the rotatable axis forms the outer pipe, as a result of which components can be saved.

To permit a heat exchange between exhaust gases and fuel or fresh air, the at least one further supply line can have a common wall section with an exhaust gas-carrying supply line, in particular with the supply line which is concentric with the rotatable axis.

In a configuration of the invention, the support has a gas connection and/or an exhaust gas outlet, in particular an exhaust gas outlet socket, to enable a safe supply of fuel or disposal of the exhaust gas.

The gas connection and/or the exhaust gas socket are in particular connected to the at least one supply line.

The support may also have a fan, which is provided in the supply line, in particular the exhaust gas line, to ensure that the appropriate gases flow reliably in the supply line.

Of course, a plurality of fans may be provided. The fan may be an exhaust gas fan, a fresh air fan and/or a cooling air fan.

For example, the at least one gas burner may be a premixing gas burner or an atmospheric gas burner such that the heat required for cooking can be reliably produced.

Figure 2:
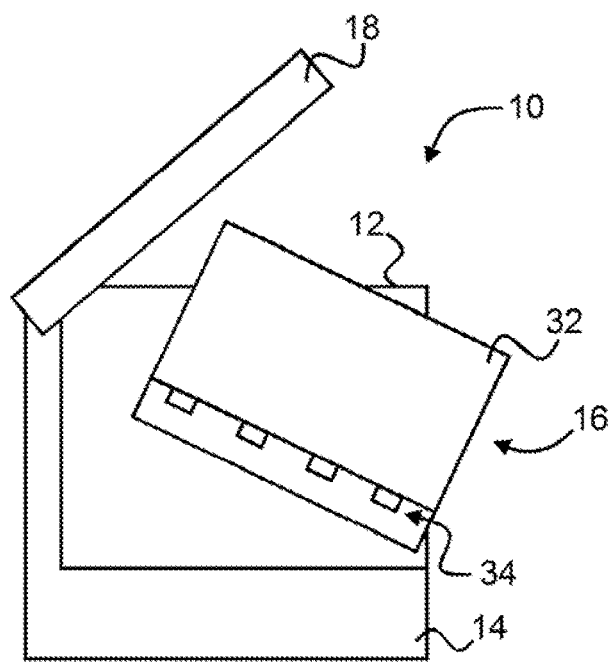
Figure 5:
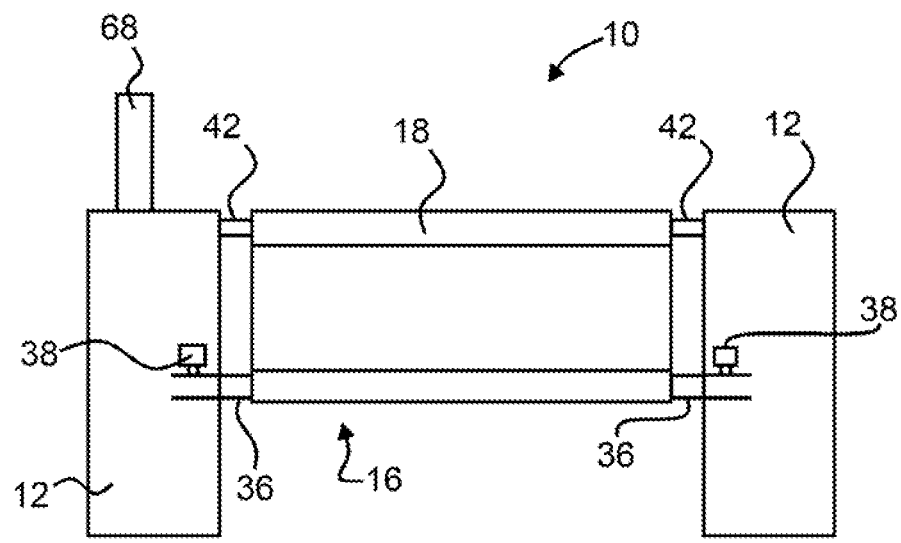

Further features and advantages of the invention will become apparent from the description below and from the attached drawings, to which reference is made and in which:

FIG. 1 shows a schematic front view of a cooking device according to the invention, FIG. 2 shows the cooking device of FIG. 1 in a side view with the cooking body swivelled, FIG. 3 shows an enlargement of the lower part of the cooking body of the cooking device of FIG. 1, FIGS. 4a to 4d show cross-sections of various embodiments according to the invention of the rotatable axis of the cooking device of FIG. 1, and FIG. 5 shows a second embodiment of a cooking device according to the invention in a front view.

FIG. 1 shows a schematic front view of a cooking device 10, which is intended for professional use in restaurants, canteens, large kitchens and large-scale gastronomy.

The cooking device 10 has a support 12, a frame 14, a cooking body 16 and a lid 18.

The support 12 has a housing 20, in which various components for operating, controlling and/or handling the cooking device 10 are provided, such as a control unit 22 and input/output means 24, such as a touch display and a button.

The housing 20 and thus the support 12 have a gas connection 26 and an exhaust gas outlet 28, which are each connected to a supply line 30 of the cooking device 10.

Unless otherwise specified, the supply lines 30 may be formed as a pipe or a hose.

The cooking body 16 has a tub-shaped cooking container 32 and a plurality of gas burners 34, in the example embodiment shown four gas burners 34, which are firmly fixed to the cooking container 32.

The cooking container 32, for example, is configured as a pan and has a capacity of more than 20 liters.

The gas burners 34 are located underneath the bottom of the cooking container 32 and can heat the bottom and thus the cooking container 32. The gas burners 34 are connected to the supply lines 30.

The cooking body 16 is connected to the support 12 via a rotatable axis 36 of the cooking device 10. The rotatable axis 36 is configured for joint rotation with the cooking body 16. By means of this rotatable axis 36, the cooking body 16 and thus the cooking container 32 can be rotated or tilted with respect to the support 12 to let food to be cooked out of the cooking container 32. A tilted or rotated position of the cooking body 16 is shown in FIG. 2.

For rotation, the support 12 has an electric drive 38 within the housing 20, which can apply a torque to the rotatable axis 36, so that the rotatable axis 36 and the cooking body 16, which is connected to the rotatable axis for joint rotation therewith, are rotated.

The frame 14 of the cooking device 10 extends below and partly behind the cooking body 16 and is firmly connected to the support 12. The frame 14 has a bearing 40 for the cooking body 16 to at least partially support the weight of the cooking body 16.

The lid 18 is furthermore attached to the support 12 via a further rotatable axis 42 and can be rotated by means of a further drive 44, which is also located within the housing 20. FIG. 2 also shows a rotated position of the lid 18.

The lid 18 can completely close the cooking container 32 to provide a closed cooking chamber.

FIG. 3 shows the area of the cooking body 16 in which the gas burners 34 are located, the rotatable axis 36 and part of the housing 20 in an enlarged view.

The supply lines 30 are clearly visible here, a first supply line 30, which is configured as an exhaust gas line 46, four second supply lines 30, which are configured as fuel lines, and a third supply line 30, which is configured as a cooling air line 50, being provided in the example embodiment shown.

All supply lines 30 run through the rotatable axis 36, as shown in FIG. 4a, which shows a section through the rotatable axis 36.

The rotatable axis 36 is configured to be hollow and forms an outer pipe 52 which surrounds or delimits the supply lines 30.

One of the supply lines 30, here the exhaust gas line 46, is configured as an inner pipe 53 concentrically with the outer pipe 52, i.e. with the rotatable axis 36, and accordingly has a smaller diameter than the outer pipe 52 or the rotatable axis 36.

An annular gap 54 is thus produced between the exhaust gas line 46 and the outer pipe 52, or more precisely the wall of the outer pipe 52.

The four fuel lines 48 which are each configured as a separate pipe or hose run through the annular gap 54. Each of the fuel lines 48 is connected to one of the gas burners 34 and supplies the latter with fuel.

The fuel lines 48 have at least partially a common wall section 56 with the exhaust gas line 46.

The part of the annular gap 54 which is not occupied by the fuel lines 48 forms a further supply line 30, namely the cooling air line 50. Thus, the cooling air line 50 also has a common wall section 56 with the exhaust gas line 46.

As can be seen in turn in FIG. 3, the fuel lines 48 are connected, on the one hand, to one of the gas burners 34 and, on the other hand, to the gas connection 26 of the support 12.

The gas burners 34 in this first example embodiment are configured as premixing gas burners, a gas-air mixture being conducted through the fuel line 48 as fuel, which is produced in a premixer 58 in the support 12.

An area 60 into which the combustion exhaust gases flow is formed between the gas burners 34 and the bottom of the cooking container 32. The exhaust gas line 46 extends from this area 60 and runs through the rotatable axis 36 to the exhaust gas outlet 28 on the support 12.

An exhaust gas fan 62 may also be provided in the exhaust gas line 46. In the example embodiment shown, the exhaust gas fan 62 is provided in the support 12.

The cooling air line 50 is fed by a cooling air fan 64 in the support 12, runs through the rotatable axis 36 and opens there into the exhaust gas line 46 and/or the area 60, the exhaust gas in the exhaust gas line 46 being thus cooled. This prevents overheating of the rotatable axis 36 and of the corresponding bearings.

In this way, the fuel supply of the gas burners 34 can be ensured, the supply lines 30 being simultaneously protected and fixed with low wear.

This also allows the gas burners 34 in the rotatable cooking body 16 to be mounted directly on the cooking container 32, which permits a more efficient heat transfer.

Further embodiments of the cooking device are explained with reference to FIGS. 4b, 4c, 4d and 5. These embodiments essentially correspond to the embodiments in FIGS. 1, 2, 3 and 4a, so that only the differences are discussed below. Identical and functionally identical parts are marked with the same reference numerals.

FIG. 4b shows a cross-section of the rotatable axis 36 of a cooking device 10 of a second embodiment.

Four fourth supply lines 30, which are fresh air lines 66 are provided in this second embodiment. Each of the fresh air lines 66 is connected, on the one hand, to one gas burner 34 and, on the other hand, to at least one fresh air inlet (not shown) of the support 12.

The fresh air lines 66 run through the annular gap 54.

In this embodiment, the fuel lines 48 do not carry a gas-air mixture, but only the combustible gas. The gas-air mixture used by the gas burners 34 is only produced separately for each gas burner 34 in the cooking body 16. One fuel line 48 and one fresh air line 66 is therefore assigned to each gas burner 34.

It is also conceivable that a fresh air fan (not shown) is provided in the fresh air lines 66.

FIG. 4c shows a cross-section through a rotatable axis 36 of a third embodiment of the cooking device.

In this third embodiment, the gas burners 34 are atmospheric gas burners.

The fuel lines 48 therefore only carry the combustible gas.

In contrast to the first embodiment, no cooling air is conducted in the annular gap 54, but fresh air, so that the annular gap 54 in this third embodiment constitutes the fresh air line 66.

In this embodiment, the annular gap 54 opens completely into the space of the cooking body 16, for example, in which the gas burners 34 are provided, so that fresh air flows through and is supplied to the gas burners 34.

FIG. 4d shows a cross-section of the rotatable axis 36 of a fourth embodiment.

In this embodiment, the annular gap 54 is divided in two, so that two supply lines 30 can be formed in the annular gap 54, for example both the fresh air line 66 and the cooling air line 50.

The fuel lines 48 are not shown in FIG. 4d for simplification. Of course, one of the two supply lines 30 in the annular gap 54 may also be configured as fuel line 48.

It is of course also conceivable that the inner pipe 53 is split in two radially within the annular gap 53 so that two supply lines 30 can be formed in the inner pipe 53. This is symbolized by a dashed line in FIG. 4d.

FIG. 5 shows a fifth embodiment of the cooking device 10 in a front view.

In this embodiment, the cooking device 10 has two supports 12, each of which is connected to the cooking body 16 via a rotatable axis 36.

A frame can be omitted in this embodiment.

The support 12 shown on the left corresponds to the previously described support 12 of the previous embodiments.

In this embodiment, however, the exhaust gas outlet 28 is configured as an exhaust gas outlet socket 68.

The drive 38 for the rotation of the cooking body 16 can be formed in one of the two supports 12, or each of the supports 12 has a drive 38.

It is of course possible to combine the features of the different embodiments with each other. In particular, further embodiments of the rotatable axis 36 are conceivable, for example by an even further subdivided annular gap 54 and/or an even further subdivided inner pipe 53.

It is of course also conceivable that not the exhaust gas line 46 but one of the other supply lines 30 runs in the inner pipe 53. In this case, a heat transfer from the exhaust gas line 46 to the other supply lines 30, in particular the fresh air line 66 and/or the fuel line 48, is also possible.

However, the outer pipe 52 may have to be provided with an insulation, as the exhaust gas line 46 is then no longer insulated by the annular gap 54.

The invention claimed is:

1. A cooking device having at least one support and a cooking body which is rotatably attached to the support via a rotatable outer pipe,
the cooking body comprising a tub-shaped cooking container and at least one gas burner,
the cooking device having at least one first line configured as an exhaust gas line, at least one second line configured as a fuel line or an air line, and at least one third line for the gas burner, which are connected to the gas burner, which extend through the rotatable outer pipe, the exhaust gas line being configured concentrically with the rotatable outer pipe,
the rotatable outer pipe surrounding the lines, the exhaust gas line having a smaller diameter than the rotatable outer pipe, as a result of which an annular gap is formed radially between the exhaust gas line and the wall of the rotatable outer pipe.

2. The cooking device according to claim 1, wherein a drive is provided in the support, which is configured such that it can rotate the rotatable outer pipe along with the cooking body.

3. The cooking device according to claim 1, wherein the at least one third line is configured as a cooling air line, and/or in that at least one fourth line is provided wherein the fourth line is configured as a fresh air line.

4. The cooking device according to claim 1, wherein the annular gap is configured as at least one further line and/or a further line runs in the annular gap.

5. The cooking device according to claim 1, wherein at least one of the second line and the third line has a common wall section with the exhaust gas line.

6. The cooking device according to claim 1, wherein the support has a gas connection and/or an exhaust gas outlet and/or wherein the support has a fan which is provided in the exhaust gas line.

7. The cooking device according to claim 1, wherein the at least one gas burner is a premixing gas burner or an atmospheric gas burner.

8. The cooking device according to claim 1, wherein a drive is provided in the support, which is configured such that it can rotate the rotatable outer pipe along with the cooking body.

9. A cooking device having at least one support and a cooking body which is rotatably attached to the support via a rotatable outer pipe, the cooking body comprising a tub-shaped cooking container and at least one gas burner, the rotatable outer pipe being located at the lower end of the cooking body directly underneath the at least one gas burner, the cooking device having at least one line for the gas burner, which is connected to the gas burner, which extends through the rotatable outer pipe and which is configured concentrically with the rotatable outer pipe, the rotatable outer pipe surrounding the at least one line, the at least one line having a smaller diameter than the rotatable outer pipe, as a result of which an annular gap is formed radially between the at least one line and the wall of the rotatable outer pipe.

10. The cooking device according to claim 9, wherein the at least one line is configured as an exhaust gas line, and wherein a second line is provided that is configured as a fuel line or an air line.

11. The cooking device according to claim 10, wherein at least one third line is provided, wherein the third line is configured as a cooling air line or a fresh air line.

12. The cooking device according to claim 9, wherein the annular gap is configured as at least one further line and/or a further line runs in the annular gap.

13. The cooking device according to claim 9, wherein the at least one line is an exhaust gas line, wherein a second line is provided that has a common wall section with the exhaust gas line.

14. The cooking device according to claim 9, wherein the support has a gas connection and/or an exhaust gas outlet, and/or wherein the support has a fan which is provided in the at least one line.

15. The cooking device according to claim 9, wherein the at least one gas burner is a premixing gas burner or an atmospheric gas burner.

16. A cooking device having at least one support and a cooking body which is rotatably attached to the support via a rotatable outer pipe, the cooking body comprising a tub-shaped cooking container and at least one gas burner, the cooking device having at least one first line and at least one second line for the gas burner, which are connected to the gas burner, the first line and the second line extending through the rotatable outer pipe, the first line being configured concentrically with the rotatable outer pipe, wherein the first line is configured as an exhaust gas line and the second line is configured as a fuel line or an air line, the rotatable outer pipe surrounding the lines, the exhaust gas line having a smaller diameter than the rotatable outer pipe, as a result of which an annular gap is formed radially between the exhaust gas line and the wall of the rotatable outer pipe.

* * * * *